US006547132B1

(12) United States Patent
Templeton et al.

(10) Patent No.: US 6,547,132 B1
(45) Date of Patent: Apr. 15, 2003

(54) POINT OF SALE PAYMENT TERMINAL

(75) Inventors: Randy J. Templeton, Houston, TX (US); Cassandra J. Mollett, Houston, TX (US); David Wayne Smith, Sugarland, TX (US)

(73) Assignee: First Data Corporation, Hackensack, NJ (US)

( * ) Notice: Subject to any disclaimer, the term of this patent is extended or adjusted under 35 U.S.C. 154(b) by 53 days.

(21) Appl. No.: 09/634,901

(22) Filed: Aug. 9, 2000

Related U.S. Application Data
(60) Provisional application No. 60/147,899, filed on Aug. 9, 1999.

(51) Int. Cl.[7] .................................................. G06K 5/00
(52) U.S. Cl. ...................................... 235/380; 235/379
(58) Field of Search ........................... 235/380; 705/16, 705/5

(56) References Cited

U.S. PATENT DOCUMENTS

| | | | |
|---|---|---|---|
| 3,599,151 A | * 8/1971 | Harr .................. 340/146.3 AG |
| 5,119,293 A | 6/1992 | Hammond | |
| 5,175,682 A | * 12/1992 | Higashiyama et al. ...... 235/379 |
| 5,677,955 A | 10/1997 | Doggett et al. | |
| 5,679,940 A | * 10/1997 | Templeton et al. ......... 235/375 |
| 5,815,657 A | 9/1998 | Williams et al. | |
| 5,832,463 A | * 11/1998 | Funk ......................... 235/375 |
| 6,039,245 A | 3/2000 | Symonds et al. | |
| 6,164,528 A | * 12/2000 | Hills et al. .................. 235/379 |
| 6,327,575 B1 | 12/2001 | Katz | |

OTHER PUBLICATIONS http://www.vfi–finance.com/tranz330.htm, Tranz 330 Fast, Low–Cost Transaction Automation At The Point Of Service, VeriFone Finance, Jan. 1999, pp. 1–3, especially pp. 1–2.

* cited by examiner

*Primary Examiner*—Michael G. Lee
*Assistant Examiner*—Lisa M. Caputo
(74) *Attorney, Agent, or Firm*—Brooks & Kushman P.C.

(57) ABSTRACT

An integrated point of sale terminal for processing multiple payment types including payment by check includes a compact housing, a processor, and memory. The housing has a base shaped to sit on a merchant counter and has a document slot for receiving a check. The processor is disposed in the housing, and the memory is in communication with the processor. The payment terminal is located at the point of sale during use to allow a store merchant to accept multiple payment types. The payment terminal further includes a magnetic ink character recognition device for reading a string of magnetic ink characters on the check. The magnetic ink character recognition device is affixed to the housing at the document slot and is in communication with the processor. Further, the payment terminal includes an imaging device for capturing an image of the check. The imaging device is affixed to the housing at the document slot and is in communication with the processor. The processor is programed to process multiple payment types including processing a checking account transaction when the check is placed in a document slot.

1 Claim, 4 Drawing Sheets

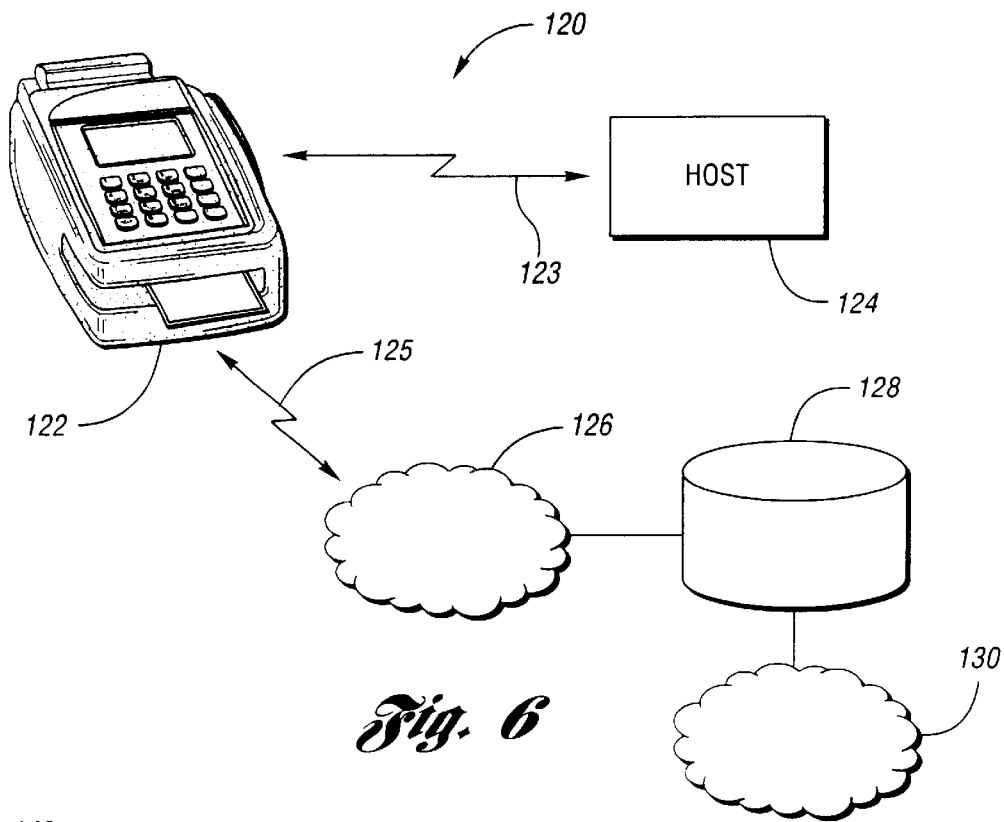
*Fig. 6*
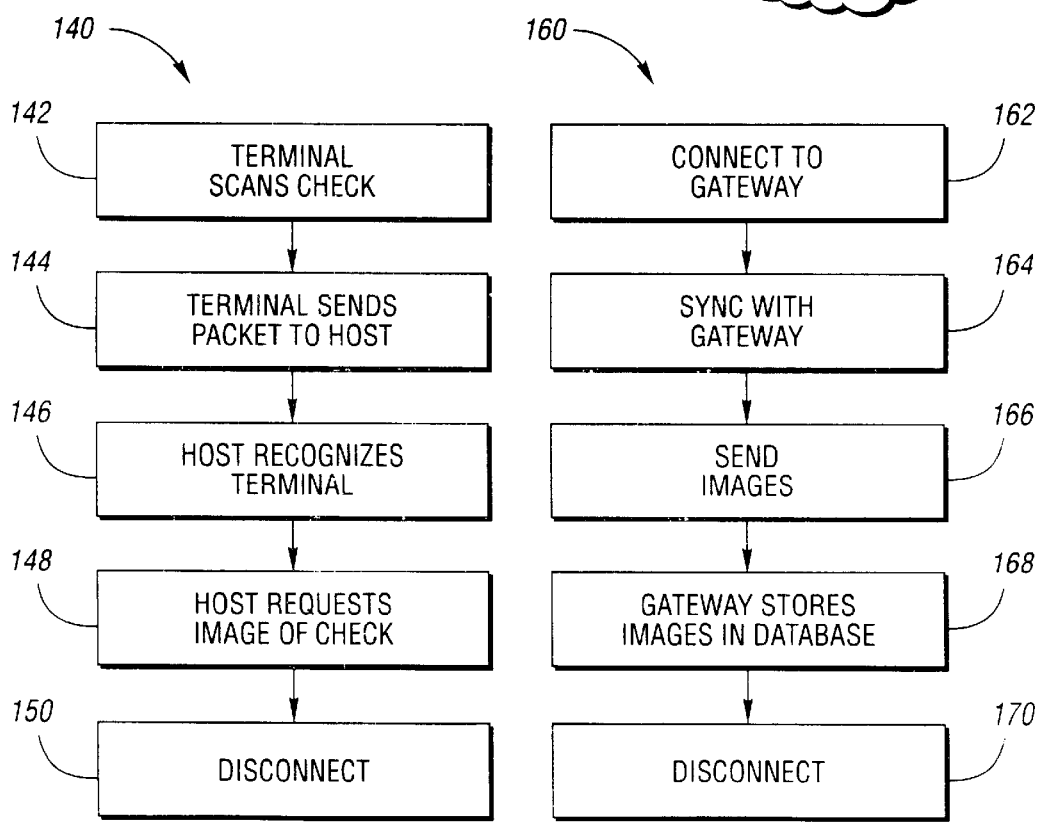
*Fig. 7*  *Fig. 8*

POINT OF SALE PAYMENT TERMINAL

CROSS-REFERENCE TO RELATED APPLICATIONS

This application claims the benefit of provisional patent application Ser. No. 60/147,899, filed on Aug. 9, 1999, and entitled "INTEGRATED POINT OF SALE DEVICE," which is hereby incorporated by reference in its entirety.

TECHNICAL FIELD

This invention relates to point of sale devices and point of sale transactions.

BACKGROUND ART

In the sale of goods by a merchant to a consumer, there are various point of sale devices available to the merchant which may be utilized to complete the transaction. Typically, each point of sale device has limited functionality. For example, one known point of sale device is the debit card reader that exists in, for example, some grocery stores. The merchant rings up a total amount due on a register, and passes the debit card through a card reader to debit the consumer account. Credit card readers work in a similar way. Usually, the functionality of these available point of sale devices is quite limited. If a merchant desires to have enhanced point of sale capabilities, multiple devices are required. Unfortunately, counter space is very valuable to the merchant good seller. Because the merchant usually must use multiple point of sale devices if more than a single point of sale function is required, these multiple devices take up valuable counter space. Although many of these devices have been commercially successful, the merchant is forced to make a trade off between having additional and enhanced capability at the point of sale and having more available counter space for small items that are commonly bought as a customer is about to check out.

For the foregoing reasons, there is a need for a point of sale payment terminal that overcomes the limitations of the prior art and allows the merchant good seller to avoid the burdensome trade off decisions that must be made when deciding the importance of added counter space versus the importance of added functionality at the point of sale.

DISCLOSURE OF INVENTION

It is, therefore, an object of the present invention to provide an integrated point of sale payment terminal for processing multiple payment types preferably including but not limited to payment by debit, payment by credit, payment by smart card, and payment by check, where the payment terminal may be located at the point of sale during use to allow a store merchant to accept multiple payment types with the single payment terminal.

In carrying out the above object, an integrated point of sale payment terminal for processing multiple payment types including payment by check, is provided. The payment terminal is located at the point of sale during use to allow a store merchant to accept multiple payment types. The payment terminal comprises a compact housing having a base shaped to sit on a merchant counter and having a document slot for receiving a check. The payment terminal further comprises a processor disposed in the housing, a memory in communication with the processor, a magnetic ink character recognition device, and an imaging device. The magnetic ink character recognition device is for reading a string of magnetic ink characters on the check, and is affixed to the housing at the document slot and in communication with the processor. The imaging device is for capturing an image of the check, and is affixed to the housing at the document slot and in communication with the processor. The processor is programed to process multiple payment types including processing a checking account transaction when the check is placed in the document slot.

In preferred embodiments of the present invention, the payment terminal further comprises a display on the housing and in communication with the processor and a keypad on the housing and in communication with the processor. Further, in a preferred embodiment, the housing has a second slot for receiving a payment card, and the payment terminal further comprises a magnetic stripe reader. The magnetic stripe reader is affixed to the housing at the second slot and is in communication with the processor.

Further, preferred embodiments include a printing device, and a modem located in the housing and in communication with the processor. And further, preferred embodiments include a serial port located on the housing and in communication with the processor for connecting an external device to the payment terminal. In addition, preferred embodiments of the present invention include a smart card reader affixed to the housing and in communication with the processor.

In some embodiments, the payment terminal is further configured to determine an authenticity of the document, and the payment terminal is further configured to utilize dynamic thresholding to, in real-time, discriminate text from background as it relates to checks at point of sale.

Further in carrying out the invention, an integrated point of sale payment terminal is provided. The payment terminal comprises a compact housing having a base shaped to sit on a merchant counter and having a first slot for receiving a payment card, a second slot for receiving a check, and a third slot for receiving a smart card. The payment terminal further comprises a processor disposed in the housing, a random access memory in communication with the processor, a display on the housing and in communication with the processor, and a keypad on the housing and in communication with the processor.

The payment terminal further comprises a magnetic stripe reader, a magnetic ink character recognition device, an imaging device, a smart card reader, a printing device, and a modem. The magnetic stripe reader is affixed to the housing at the first slot and is in communication with the processor. The magnetic ink character recognition device is for reading a string of magnetic ink characters on the check, and is affixed to the housing at the second slot in communication with the processor. The imaging device is for capturing an image of the check, and is affixed to the housing at the second slot and in communication with the processor. The modem is located in the housing and in communication with the processor.

The processor is programmed to process multiple payment types from the consumer, including processing a credit card or a debit card. The credit card or debit card is processed when the credit card or debit card is passed through (or equivalently is received in) the first slot and a receipt is printed. The smart card is processed when the smart card passes through the third slot and a receipt is printed. Further, the processor is programmed to process a checking account transaction when a check is placed in the second slot.

Advantageously, the single payment terminal has a compact housing allowing the acceptance of multiple payment types while avoiding overuse of counter space.

Advantageously, the processor and associated devices may handle, for example, credit card payment, debit card payment, smart card payment or checking account payment which may be payment by paper check or payment by electronic debit.

In some embodiments of the present invention, the payment terminal comprises a printing device configured to print on a roll receipt and further configured to print on a check (or other document, for example, a money order) that is received in the second slot. That is, advantageously, a single printing device may print receipts off of a paper roll or print directly to a check to, for example, fill out the blanks on a check or frank the back of the check as "for deposit." Preferably, the processor is further programmed to, when processing a checking account transaction, print a receipt on the check and treat the transaction as an electronic debit. Printing the receipt may include marking the check as void or processed. Alternatively, when processing a checking account transaction that is a payment by paper check as opposed to an electronic debit of the checking account, the processor is programmed to frank the check as "for deposit."

In addition to embodiments of the present invention including a modem for connecting to a host that approves the transaction or requests other information regarding the transaction, preferred embodiments of the present invention include one or more serial ports in communication with the processor for connecting an external device to the payment terminal. For example, the payment terminal processor may be configured to support various auxiliary input devices that may be connected through the serial port. For example, some embodiments of the present invention may further be provided with an integrated smart card reader or in the alternative, a smart card reader may be connected via one of the available serial ports.

Still further, in carrying out the present invention, an integrated point of sale payment terminal for processing multiple payment types including payment by debit, payment by credit, payment by smart card, and payment by check, is provided. The payment terminal compromises a compact housing having a base shaped to sit on a merchant counter and having a first slot for receiving a consumer payment card and a second slot for receiving a consumer check. The payment terminal further comprises a processor, a random access memory, a display, a keypad, a magnetic stripe reader, a magnetic ink character recognition device, an imaging device, and a printing device. The magnetic ink character recognition device is for reading a string of magnetic characters on the check, and is affixed to the housing at the second slot and in communication with the processor. The imaging device is for optically reading the check, and is affixed to the housing at the second slot and in communication with the processor. The processor utilizes both the magnetic ink character recognition device and the optical character recognition device to determine a content of the string in these embodiments of the present invention.

Advantageously, the combination of the magnetic ink character recognition device and the imaging device provides enhanced ability for the payment terminal to read the routing and account numbers from the bottom of the check. Alternatively, only the magnetic ink character recognition device or only the imaging device may be used instead of both, but both are preferred. The imaging device may be configured with sufficient imaging range to provide an image of the entire check while also being capable of scanning the bottom edge of the check where the routing and account numbers are located.

The advantages associated with embodiments of the present invention are numerous. For example, embodiments of the present invention provide a single payment terminal utilizing a compact housing that sits on a merchant counter. The compact housing uses minimal space while providing maximal functionality with the various devices provided on the payment terminal for accepting various types of payments such as debit cards, credit cards, payment by check, payment by smart card, etc. It is to be appreciated that embodiments of the present invention provide the functionality that heretofore was only provided by multiple devices with each of the devices taking up valuable counter space which was undesirable to the merchant. With the present invention, the merchant no longer faces the difficult trade off decision of counter space versus payment acceptance versatility, but can instead utilize a payment terminal of the present invention to use a reduced amount of counter space due to the compact housing while having the added functionality and versatility of the present invention payment terminal.

The above object and other objects, features, and advantages of the present invention will be readily appreciated by one of ordinary skill in the art from the following detailed description of the best mode for carrying out the invention when taken in connection with the accompanying drawings.

BRIEF DESCRIPTION OF DRAWINGS

FIG. 6 is a diagram illustrating a payment terminal of the present invention communicating with a host and communicating over a network to upload an image of a check;

FIG. 7 is a block diagram illustrating the authorization process; and

FIG. 8 is a block diagram illustrating the process for uploading images from the payment terminal to the network.

BEST MODE FOR CARRYING OUT THE INVENTION

Figure 1:
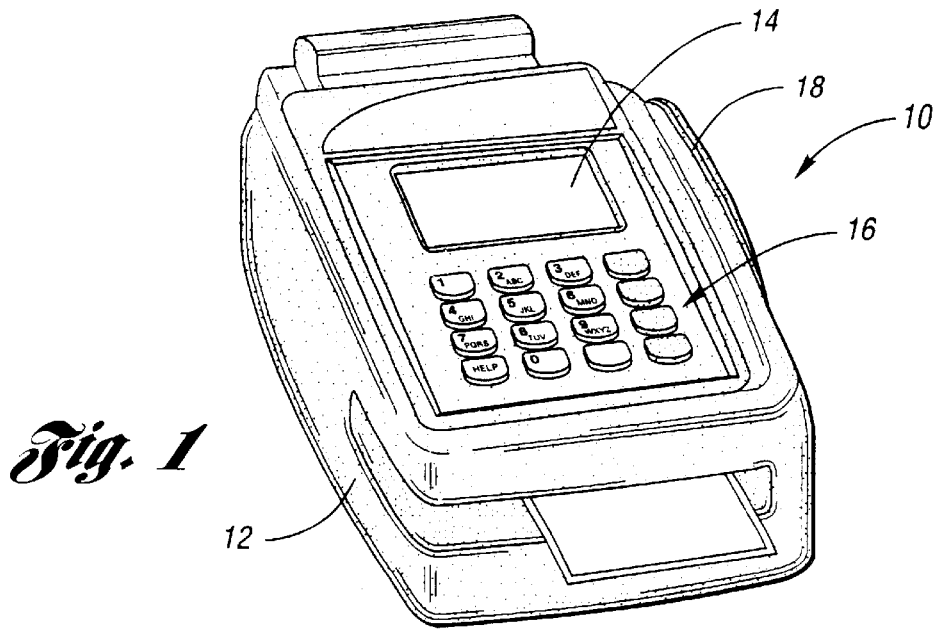
FIGS. 1–3 illustrate a preferred embodiment of the present invention with various views of the preferred payment terminal.
Figure 2:
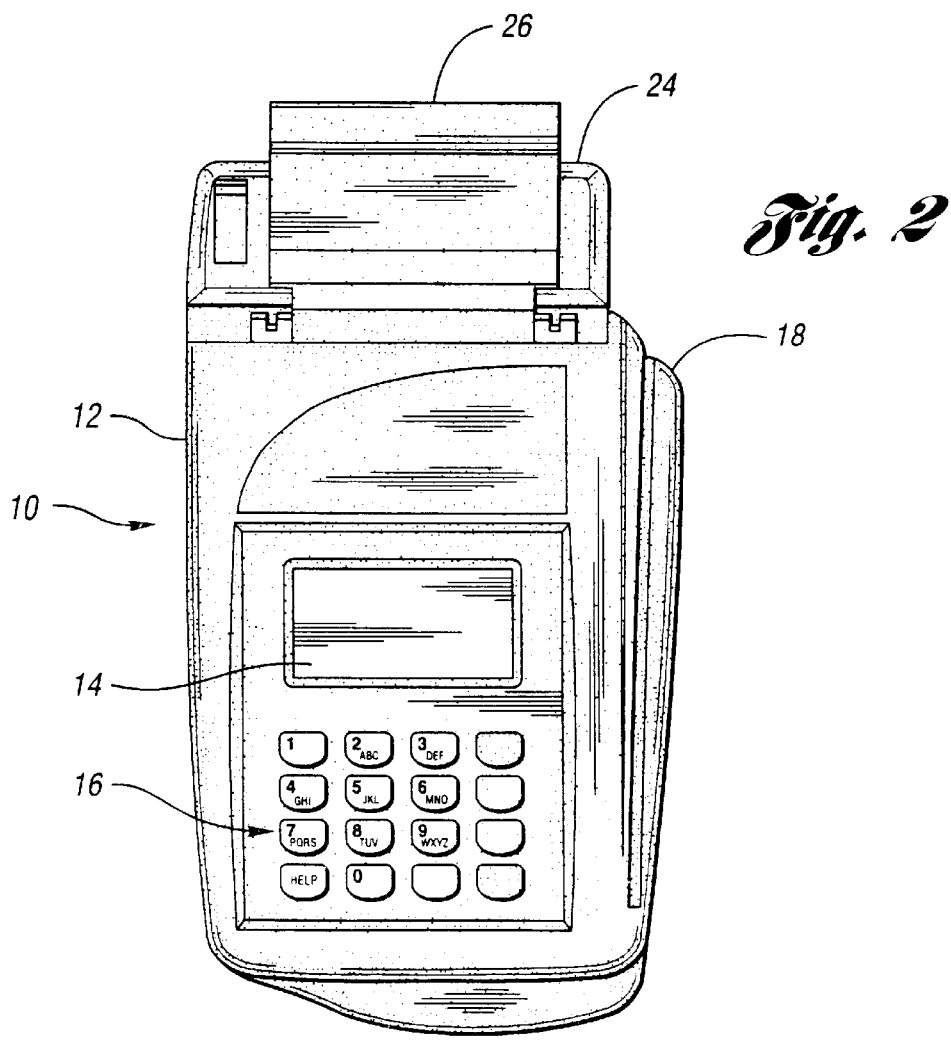
Figure 3:
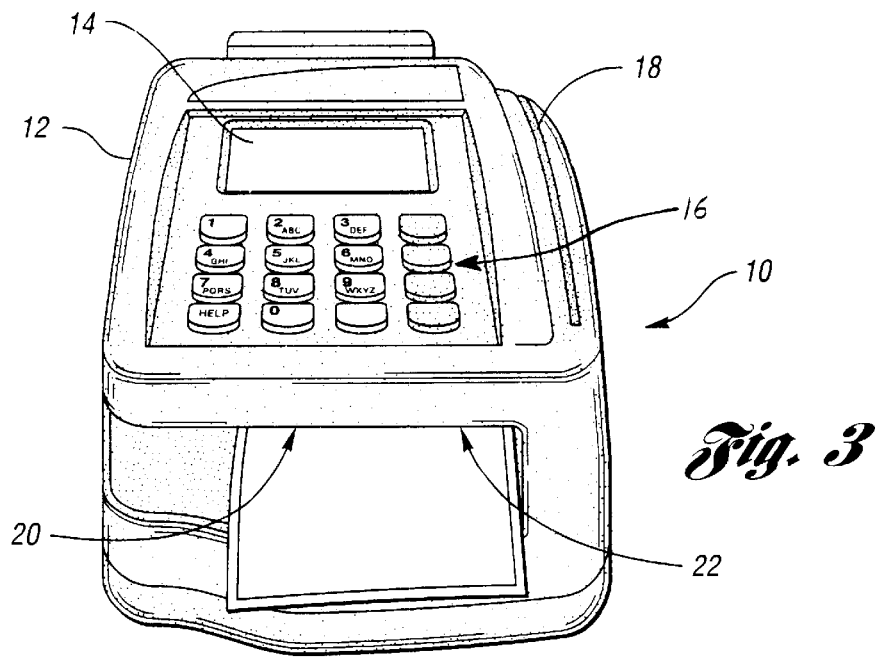

In FIGS. 1–3, a payment terminal of the present invention is generally indicated at 10. It is to be appreciated that the payment terminal is preferably the Eclipse™ payment terminal available from TeleCheck Services, Inc., having a place of business in Houston, Tex. TeleCheck Services, Inc. is a division of First Data Corporation. Further, it is appreciated that there are many variations for embodiments of the present invention, and the Eclipse™ is merely the preferred implementation. For example, preferred embodiments of the present invention are constructed to meet the hardware specifications that are specified further herein, but may take many forms that vary physically in shape, size, hardware, and software than the Eclipse™, but are still comprehended by the present invention. Further, additional background information that is relevant to embodiments of the present invention may be found in provisional patent application serial No. 60/147,899, filed on Aug. 9, 1999, and entitled "INTEGRATED POINT OF SALE DEVICE." Further, although preferred specifications are mentioned herein, the specifications for the Eclipse™ are available from TeleCheck Services, Inc.

With continuing reference to FIGS. 1–3, where a preferred embodiment of the payment terminal 10 is illustrated, payment terminal 10 includes a housing 12. Payment terminal 10 further includes a display 14 and a keypad 16. Payment terminal 10 preferably uses a 32-bit, 24 MHZ Motorola 68302 processor, along with 1 MB–4 MB flash memory, and 512 Kb–4 MB static random access memory, with both memories backed by a battery. A suitable display is a backlit graphic liquid crystal display of the chip on glass type, having 8 lines by 20 characters, or 128×64 pixels. A suitable keypad includes 16 programmable keys. Alternatively, a larger display with a touch screen may be employed without a full size keypad.

A magnetic stripe reader 18 is preferably a bidirectional magnetic stripe reader. An imaging device 20 is preferably capable of 300 dot per inch captures and may capture documents as large as a standard business check. A magnetic ink character recognition device 22 is capable of reading a string of magnetic ink characters on the check (check means either a personal or a business check). A suitable magnetic ink character recognition device is capable of reading E13B and CMC7 fonts. As mentioned previously, preferred embodiments also utilize optical character recognition. Optical character recognition may be implemented as a function of the imaging device 20. A printer 24 is preferably an ink jet printer capable of printing on roll paper or on checks received in the check slot. The roll paper is received at 26. Of course, it is appreciated that the printer may be suitable for printing on other documents in addition to checks, such as filling out money orders which may be imaged and sent to the host. Further, the terms check slot and document slot are used interchangeably herein, and mean any slot that receives documents for reading and/or printing.

Figure 4:
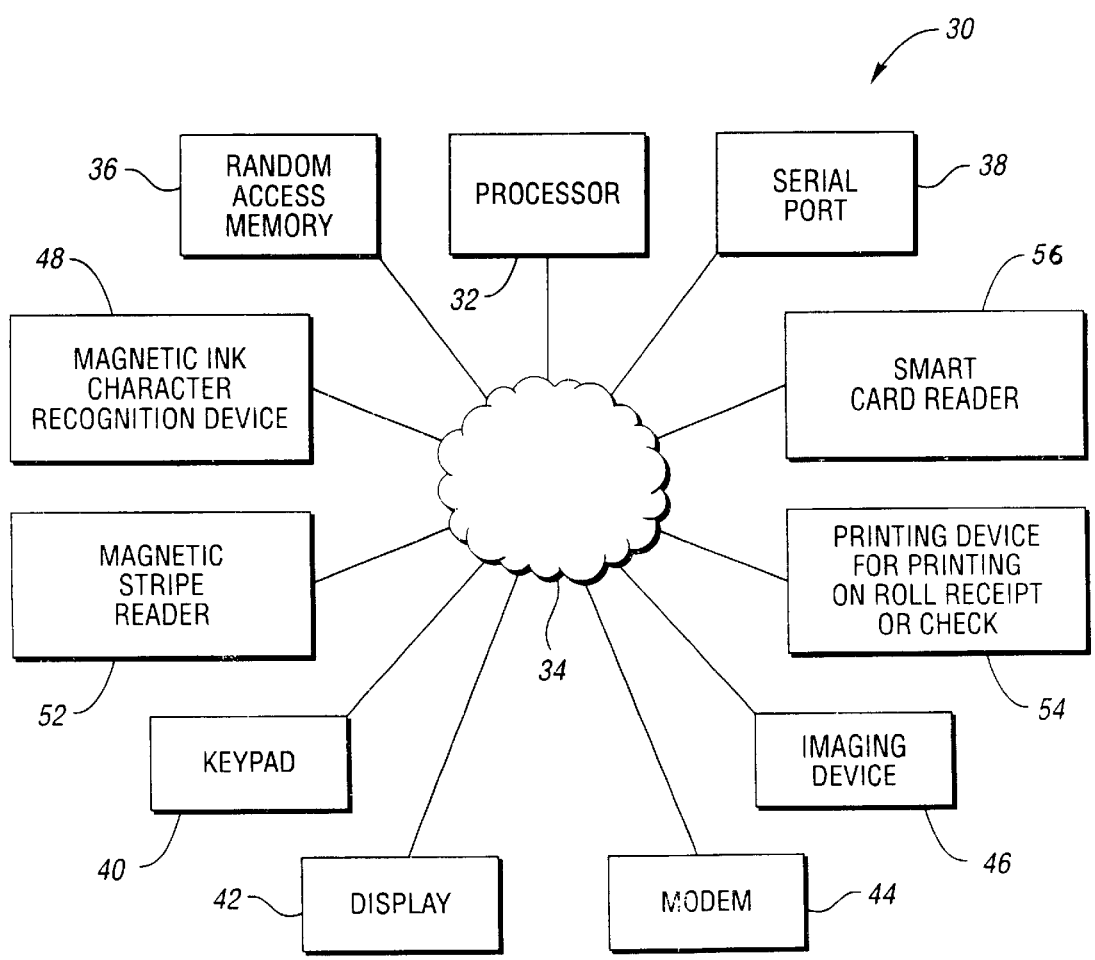
FIG. 4 is a block diagram illustrating the cooperation of the various hardware components of a payment terminal of the present invention.

Terminal 10 preferably includes a smart card reader (56, FIG. 4) for reading smart cards. A smart card is a typically credit card sized card that includes at least some processing power. A smart card reader is optional, and may be formed as an integrated reader on the terminal or may connect to a serial, or alternatively, a parallel, port on the terminal device. A smart card, because of the processing power, provides more security compared to a traditional credit or debit card. Not specifically shown in FIGS. 1–3, terminal device 10 includes a suitable connector for connecting to a power cord that plugs into a standard wall socket to provide power for terminal device 10. Even further, preferred embodiments of the terminal device include a modem and a pair of phone terminals. The modem may be, for example, a standard 14.4 Kbps synchronous/asynchronous modem or a V.90 modem (56 Kbps modem). Preferably, the terminal device is configured with a small footprint to limit the amount of valuable counter space taken up by the device. For example, the Eclipse™ has a height of 75 mm, a width of 146 mm, and a depth of 290 mm.

As mentioned previously, a terminal device of the present invention preferably meets the specifications given above for the Eclipse™, but various modifications may be made while still falling within the scope of the present invention. A preferred embodiment of the present invention is broadly illustrated in block diagram 30 of FIG. 4 which illustrates a cooperation of various elements to provide an enhanced payment terminal processing multiple payment types. Processor 32 communicates over any suitable communication path 34 (such as a data bus) with various other elements of the terminal device. The other elements include, in the example illustrated, random access memory 36, one or more serial ports 38, a keypad 40, a display 42, a modem 44, and an imaging device 46. In addition, preferred embodiments include a magnetic ink character recognition device 48. In addition, the terminal device includes magnetic stripe reader 52 and a printing device 54 for printing on roll receipt paper or on a check, money order, or other document inserted in the document receiving slot on the payment terminal.

A suitable operating system for use with the Motorola 68302 processor is the TXO operating system developed by Verifone, a division of Hewlett-Packard. Of course, other operating systems may be suitable for embodiments of the present invention as is appreciated by those skilled in the art of microprocessor programming.

Figure 5:
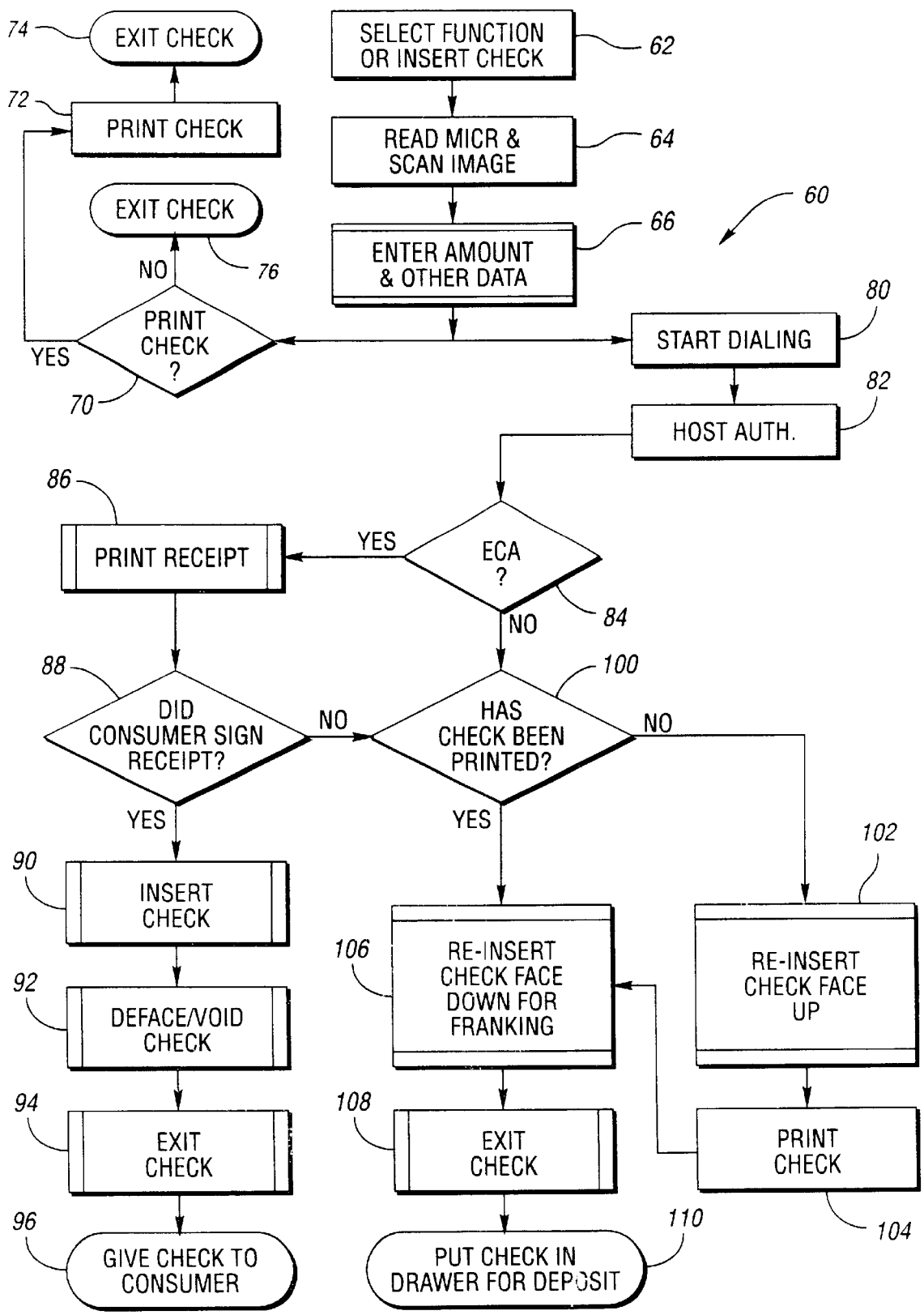
FIG. 5 is a flow chart illustrating an example of payment and payment terminal operation with a payment terminal of the present invention.

With reference to FIG. 5, a check transaction scenario with the terminal device of the present invention is generally indicated at 60. Of course, it is appreciated that the terminal device of the present invention is suitable for various types of transactions including debit card, credit card, smart card, as well as check based transactions and that the examples shown in FIG. 5 are merely exemplary of the many functions and features possessed by preferred embodiments of the terminal device.

It is appreciated that the below description explains a suitable construction of the integrated point of sale (POS) device and operation of a payment terminal device in greater detail, and that the present invention is not limited to the particular specifications and operations described below. The integrated point of sale (POS) device of the present invention addresses the needs of the check conversion market. The product is an integrated check/credit/debit/smart card capable terminal with internal Magnetic Ink Character Recognition (MICR), Imaging, Magnetic Stripe Reader (MSR), modem, RS232 and/or RS485 serial ports and a combined document/receipt printer. The terminal integrates an ink-jet printer capable of printing on the check or other document. This same printer is also used to print the transaction receipt(s).

The combination of magnetic and optical reads reduces read and substitution errors of the MICR digits on a check. For example, in reading checks, a preferred terminal has both magnetic and optical read capability. By implementing a combination or subcombination of the above devices, the integrated point of sale (POS) device is able to capture only the essential customer information from the face of the check to aid in settlement and returns collection. Also, the capture of the MICR image aids in resolving magnetic decoding errors of routing and account numbers.

The preferred payment terminal (or point of sale device) is capable of dynamic downloading which allows the host to change parameters or download any new applications on the machine when the host determines that a particular device is using outdated software. This process begins where the POS device sends the application version in the authorization packet. If the host determines a more current version of the application is required, the host will send an indicator/tag in the response packet. The terminal application will set the POS device to contact (dial) the host at a specific time to pick up a new application.

Typical Check Transaction Scenario

The terminal is capable of printing the date, payee, text amount and numeric amount onto the check to speed the transaction at the point of sale. If this option is desired, the clerk inserts the unsigned blank check into the terminal for printing. The printed check is then returned to the customer. Under the standard conversion model, it is not important for the customer to actually sign the check. Some elements listed below may happen concurrently based on the overall throughput of the terminal, such as steps (c)/(d) and (e)/(f).

Typical Transaction Flow

A. The Telecheck Electronic Check Acceptance (ECA) service starts when the clerk inserts a check into the terminal or selects check and sale on the touch screen and inserts the check when prompted (block 62).

B. The terminal reads the MICR line and/or the terminal images the check. The MICR line may be read both magnetically and optically and then exit the check through the paper path in the top back of the terminal. An alternative method is to have the terminal read the MICR line twice (forward and backward) then exit the check through the front of the terminal (block 64).

Note: The check may not completely exit. The check may partially exit so that the merchant does not need to re-insert the check for de-facing/void or to print (payee/amount/text amount, etc.)

C. Clerk removes the check

D. The terminal pre-dials (block 80) while the clerk enters the transaction data (block 66).

E. The terminal starts pre-printing the receipt (blocks 70, 72, 74, 76).

F. Authorization process is initiated (block 82).

G. Authorization response is received by terminal (block 84).

H. Merchant receipt automatically prints (block 86).

Note: The customer receipt may be printed on a separate piece of paper or may be printed on the back of the check.

The typical transaction flow may vary depending on factors which include but are not limited to circumstances where: (1) the checkwriter signs the receipt; (2) the check writer does not sign the receipt; (3) a merchant receipt does not automatically print. Some of these variations are apparent from FIG. 5.

If the Check Writer Signs the Receipt

I. Check writer signs receipt authorizing their check to be electronically processed (block 88).

J. Merchant re-inserts check to void/deface (this may be done on the front or back of the check). It is important to note that this step may also deviate in that the merchant may not be required to re-insert the check given that the check is merely pulled back into the terminal. At step (C) above, the check may only partially exit the device so that the check is later pulled back by the terminal to deface or print (blocks 90, 92).

Note: The check may not completely exit. The check may partially exit so that the merchant does not need to re-insert the check for defacing/void or to print (payee/amount/text amount, etc.).

K. Merchant may print the check writer receipt on the back of the check or conventional separate receipt.

L. Check and receipt are given to the check writer (blocks 94, 96).

If the Check Writer Does Not Sign the Receipt or a Merchant Receipt Does Not Automatically Print at Block 84

I. Merchant may insert check (blocks 100, 102, 104) to print face (date, amount, etc.).

Note: The check may not completely exit. The check may partially exit so that the merchant does not need to re-insert the check for defacing/void or to print (payee/amount/text amount, etc.).

J. If the check is not already signed, the merchant asks the check writer for his/her signature.

K. Merchant re-inserts check face down to frank for deposit (block 106).

L. Merchant keeps the check for deposit (blocks 108, 110)

Check conversion application (ECA) includes on screen batch/transaction detail and summary reports. These reports can also be printed. Batch reconciliation, reporting and closing similar to credit cards.

It is appreciated that, in the alternative, it may not be necessary to have the customer sign the receipt. That is, the full image of the check may be used to process an electronic debit to facilitate Image Based Check Processing or Presentment. Implementations of the present invention may allow for three different types of transactions. The first type is processing the check as a paper check, without requiring a signed receipt. The second type of transaction is image based processing or presentment. The third type is electronic check conversion, which will require a signed receipt.

Paper Jam Clearing

The device preferably contains an internal paper transport mechanism, and it is important that the rare occurrence of a paper jam be cleared quickly and easily. Paper checks and other documents can vary widely in flatness, thickness, and shape.

In the event of a jam, the device is designed with a front latch and rear hinge on the topcase to allow internal access of the paper path. Once the unit has been opened, the leading or trailing edge of the jammed document can be easily removed from the mechanism. Normal terminal operation will resume after the topcase is latched into the closed position.

Mechanical Requirements

A suitable device conforms to the following specifications. Mechanical requirements for governing mechanical standards, case design, display and keypad, MICR, imaging, transport design, MSR, smart card, modem, printer, reliability, safety, environmental and regulatory requirements are described in provisional patent application serial No. 60/147,899. Of course, it is appreciated that those requirements are suitable and that requirements may vary on different implementations of the payment terminal.

Hardware

Further, a suitable device conforms to the following hardware requirements. Hardware requirements for governing standards, memory, ports, real time clock, display and keypad, MICR, MSR, smart card reader, modem, imaging, printer, power, power failure, safety and regulatory environmental, reliability and sound output are described in provisional patent application serial No. 60/147,899. Of course, it is appreciated that those requirements are suitable and that requirements may vary on different implementations of the payment terminal.

Software

Further, a suitable device conforms to the following software requirements. Software requirements for memory, ports, downloading, keypad and sound, MICR, MSR, smart card reader, modem, imaging, printer, power failure, operating system and applications development support environment, and mechanical (reset) are described in provisional patent application serial No. 60/147,899. Of course, it is appreciated that those requirements are suitable and that requirements may vary on different implementations of the payment terminal.

Implementation of Software

Still further, a suitable device conforms to the following requirements for implementation of software. Implementation of software requirements for authorization, storage, and retrieval are described in provisional patent application serial No. 60/147,899. Of course, it is appreciated that those requirements are suitable and that requirements may vary on different implementations of the payment terminal.

Communicating Between the Integrated POS Device and The Host

Referring to FIG. 6, this process, generally indicated at 120, starts with the communication between the terminal 122 and the host 124. In this process there are two sets of communications.

(1) Communication one 123 (and FIG. 7) is with the standard host. The primary function of this communication is to get approval for the check that has just been scanned. Approval includes a set of eligibility rules at the host that determine eligibility status for the transaction as an electronic check conversion. Also the host can send a request for image blocks from the scanned check to be sent.

(2) The second communication 125 (and FIG. 8) of this process is to send the requested images. This communication is not sending every time a check is scanned. The terminal will wait and batch up several checks and send them all at once. Of course, alternatively, an image may be sent with each transaction as opposed to storing several images and sending them during idle time.

The remaining portion of this process is to send the requested images to Telecheck or another suitable service company. This gateway 126 primarily receives the image blocks and stores them in tagged image format (TIF) in a temporary directory 128 on the gateway itself, then the images may be grabbed over network 130 by the backend systems which may vary depending on the overall network structure.

Method of Communicating Between the Integrated POS Device and the Host (140)

1. The terminal scans the check (block 142). During normal processing the terminal scans the check and the magnetic code. It will retain the entire image. From the magnetic media the standard processing will take place. The storage capacity of the terminal may suitably be 1 MB.

2. The terminal sends the check information to the host (block 144). This information may include the billing number (BN), dollar amount and the identification (driver's license, etc). Alternatively, any suitable information may be included as is appreciated by one of ordinary skill in the art. Also with this packet will be an identifier to inform the host that the terminal hardware does support imaging.

3. Host determines that the terminal supports imaging (block 146).

4. The host requests the image, if desired (block 148), and the communication is ended (block 150). The host preferably includes suitable logic for determining whether or not an image of the check should be requested immediately, requested to be sent at the next idle time, or not sent at all. The logic bases the decision of whether or not to request the check image and when to request the check image, on any number of factors. For example, the decision may be based on transaction risk or historical information. That is, a higher risk transaction may require an immediate transfer of the check image. Further, the amount of risk necessary before a transaction requires the immediate sending of an image may vary depending on the amount of the transaction such that higher transaction amounts will require an immediate transfer of the image when there is less risk than a lower transaction amount. For example, the logic may look to the data base and see what information is available regarding the particular account number, and how old that information is. If the information is relatively old relative to the particular risk associated with that transaction, an immediate image transfer may be required. On the other hand, if recent information is available regarding the account number, the image may be suitably sent at idle.

5. As shown in FIG. 8, (generally at 160), the terminal connects to the gateway (block 162). Images may be sent directly after each communication or at idle times in batches of several images.

6. The terminal synchronizes with the gateway (block 164).

7. The terminal sends requested images to the gateway (block 166).

8. The requested images are transferred from the terminal and placed in a directory on the POS gateway (block 168).

9. End of Transmission: The terminal disconnects (block 170).

It is appreciated that the most preferred implementation of the terminal device is the Eclipse™ available from Telecheck Services, Inc. Of course, it is appreciated that implementations of the terminal device of the present invention may vary in accordance with the broad description given previously.

It is further appreciated that the backend network applications (cloud 130, FIG. 6) may vary substantially in different implementations of the present invention. It is appreciated that embodiments of the present invention, for the very first time, provide a payment terminal with enhanced versatility by providing numerous different devices all within the same physical device. In addition to the imaging device and requirements discussed above, it is contemplated that embodiments of the present invention may have suitable technology to look for water marks on checks in addition to detecting counterfeit currency.

It is appreciated that the technology used to look for water marks and/or detect counterfeit currency or checks may be any known or available technology as appreciated by one skilled in the art. For example, the technology may utilize a light source, a form of imaging, or any other known technique for detecting authenticity of documents including currency.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of electronic check conversion for use with an integrated point of sale payment terminal for processing multiple payment types including payment by check, the payment terminal being located at the point of sale during use to allow a store merchant to accept multiple payment types, the payment terminal including a compact housing having a base shaped to sit on a merchant counter and having a document slot for receiving a check, a processor disposed in the housing, a memory in communication with the processor, a magnetic ink character recognition device for reading a string of magnetic ink characters on the check and affixed to the housing at the document slot and in communication with the processor, and an imaging device for capturing an image of the check and affixed to the housing at the document slot and in communication with the processor, wherein the processor is programmed to process multiple payment types including processing a checking account transaction when the check is placed in the document slot, the method comprising:

capturing an image of the check at the payment terminal;

sending a check transaction to a host;

accessing a set of image rules at the host;

determining an image status of the transaction based on the set of image rules, the image status being determined as required when dictated by estimated transaction risk; and immediately requesting the transferring of the image from the payment terminal to the host when the image status is required, otherwise, allowing the payment terminal to transfer the image to the host, if at all, when the payment terminal is idle.

* * * * *